April 24, 1928.

C. S. HALL
AIRCRAFT
Filed Nov. 12, 1921

CHARLES S. HALL.
INVENTOR.

BY Daniel N. Clark
ATTORNEY

April 24, 1928.

C. S. HALL 1,667,002

AIRCRAFT

Filed Nov. 12, 1921

Charles S. Hall
INVENTOR.

BY Daniel N. Clark
ATTORNEY

April 24, 1928.  C. S. HALL  1,667,002
AIRCRAFT
Filed Nov. 12, 1921  4 Sheets-Sheet 4

Charles S. Hall
INVENTOR

BY Daniel N. Clark
ATTORNEY

Patented Apr. 24, 1928.

1,667,002

UNITED STATES PATENT OFFICE.

CHARLES S. HALL, OF LOS ANGELES, CALIFORNIA, ASSIGNOR TO HALL AIRWAYS CORPORATION, OF DOVER, DELAWARE, A CORPORATION.

AIRCRAFT.

Application filed November 12, 1921. Serial No. 514,737.

My invention relates to an improvement in aircraft and has for its object to provide a means whereby a normally heavier-than-air type of aircraft may be combined with air-tight, lighter-than-air compartments encased within the same common hull or body having all external horizontal surfaces aliform with respect to the normal line of flight.

Another object of the present invention is to secure the lifting effect of the buoyant compartments in conjunction with the lifting effect produced by the aliform body from the stream-line-flow suction upon the upper surface and the deflection of the air following the camber of the lower surface while in flight.

A further object of my invention is the acquirement of a constant lifting effect upon the said aircraft at all times by means of the buoyancy of the compartments, whether filled with lighter-than-air gas, or used as a vacuum, and all contained within the aliform body of the aircraft.

A further object is the production of a type of aircraft which will be able to take the air, and also to make a landing, at greatly reduced ground speeds because of the constant lifting effect conjointly produced by the buoyant compartments combined and augmented by the lifting effect produced by the aliform body of the aircraft, and all in conjunction with lifting propellers.

Another object is to secure this combined lifting effect in an aircraft of relatively light weight, easily controlled and well stabilized, yet retaining all the benefits of the aeroplane type in swiftness, agility, and efficiency.

It is well known, in heavier-than-air type of aircraft and, more particularly, in the type commonly known as the aeroplane, that in flight the weight thereof requires a relative downward deflection of a given quantity of air at a given velocity in order that the lift produced by the aerofoil structure thereof will be sufficient to raise the said aircraft into the air; that in order to secure this necessary lifting effect, in order to first take the air, a relatively high ground speed must be attained in the normally heavier-than-air type of aircraft before this lift so produced will enable the aircraft to take the air as hereinbefore pointed out; that this high ground speed is dangerous to the life of the operators and passengers, as well as destructive of the aircraft itself; and that this speed varies the momentum as well as the intensity of the friction and of the vibration of the aircraft directly according to the velocity of the aircraft, a condition carrying a direct ratio of the dangers involved in such high ground speed, either in taking off or in landing. Hence, any device, or combination of devices, such as here produced, which may result in, or which may produce, a marked reduction of this ground speed, carries a concomitant benefit by the proportional elimination of the said dangers. And thus it will be manifest that the great benefit so desired, and so essential to aircraft in general and the life and limb of aerial navigators in particular, are produced in this invention.

Such is one of the aims of the present invention brought about by the combination of the aerofoil body, with its lifting effects as above described and as here shown, thereby securing all the benefits of the buoyancy of the compartments filled with lighter-than-air element and the lifting effects produced by the aerofoil surfaces in addition to the lifting propellers.

It will be seen that while dimensions are multiplied by two, the area of all external surfaces, or all plane surfaces are increased by the square, while volumes are increased by the cube, of such multiplied dimensions. Hence, the increased displacement found in larger dimensions of the air-tight lighter-than-air compartments, when compared with the increased quantity of material used in the construction thereof, bears such advantageous disproportion between the volumetrical relations that in larger dimensions the lifting advantages may be increased by the cube of the increased dimensions. And when to these advantages we combine the same with the advantages of an aeriform heavier-than-air type of construction augmented by the vertical lifting propellers encased and co-axiled in vertically disposed tubes constructed within the aircraft body and all combined with the buoyant compartments as herein described, it becomes manifest that the synchronous lifting benefits thus obtained inure not only to the safety of operation, by the comparatively low ground speeds required in landing and in taking off, as hereinbefore pointed out, but also that the general buoyancy thus produced will enable the aircraft to acquire a given elevation by the use of less engine power, less speed, involving less momentum, less friction, less vibration and less danger to the life and limb of the operators and passengers or of the destruction of the aircraft.

This invention is an improvement over that shown and described in my application for Letters Patent filed August 29, 1921, Serial Number 496,530, and to the inventions therein enumerated.

Other objects and aims of my invention, not at this time more fully and particularly enumerated, will be made clear from the following detailed description.

With these objects in view I will now describe my invention with reference to the accompanying drawings, which form an essential part of this specification.

Figure 1:
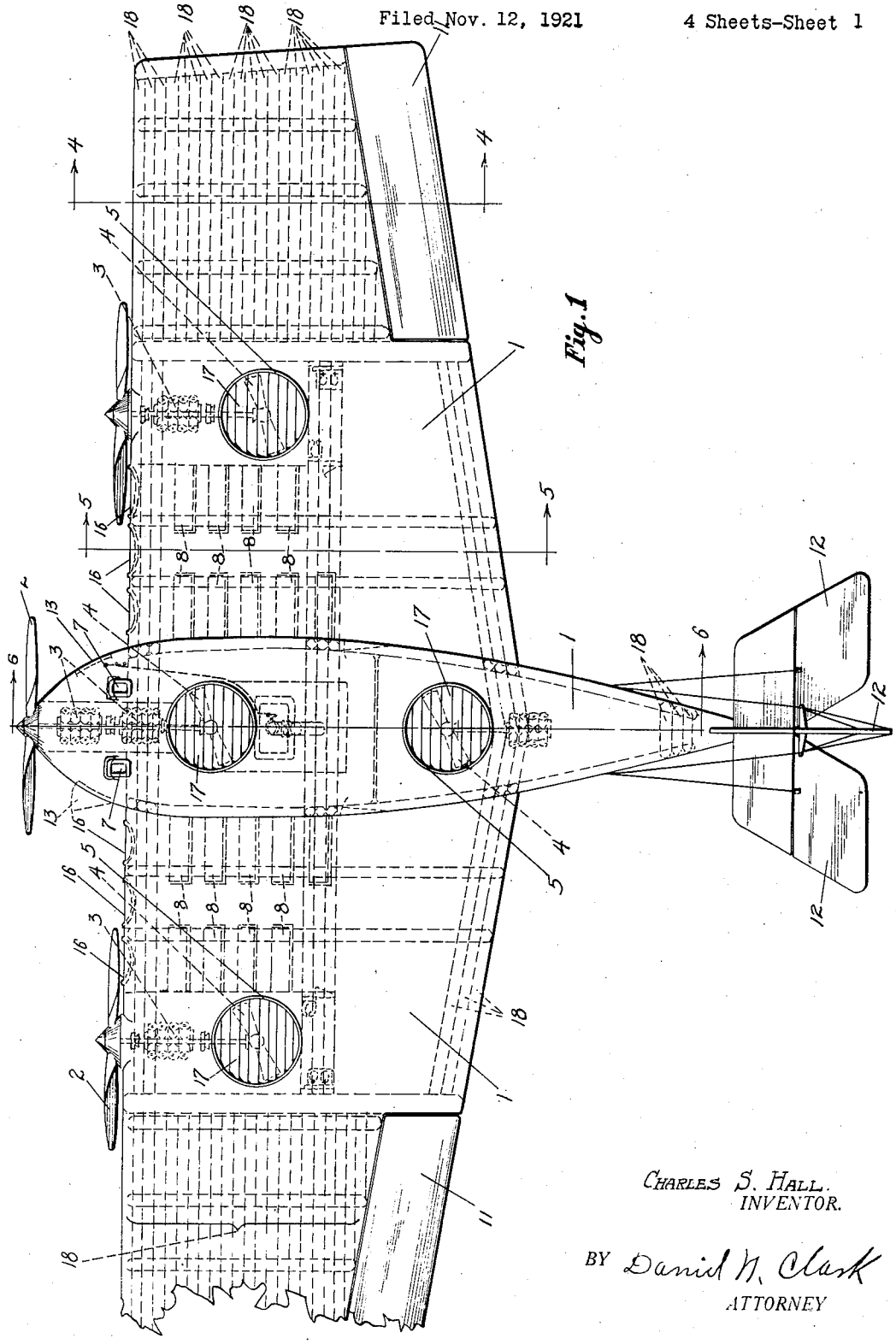
Figure 1, is an exterior schematical plan view of the aircraft looking upon the upper surface embodying my invention, showing the detail arrangement, with the internal features drawn in subdued lines, with cross sectional lines 4—4, 5—5, 6—6, referring to other figures of the drawings.
Figure 2:
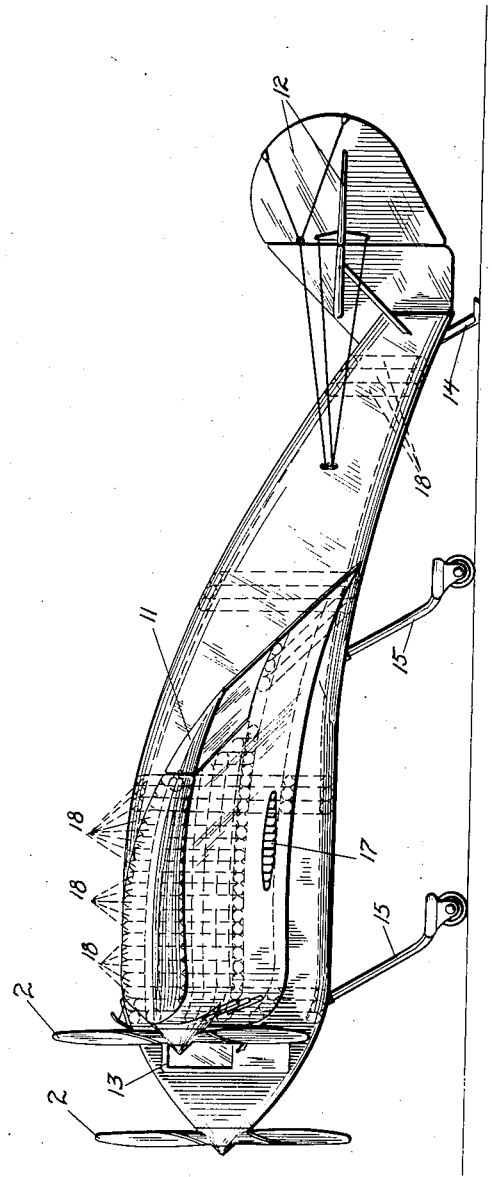
Figure 2, is a side elevational exterior view of the aircraft taken at 90 degrees angle to that shown in Figure 1, showing the details of arrangement and the outlines thereof.
Figure 3:
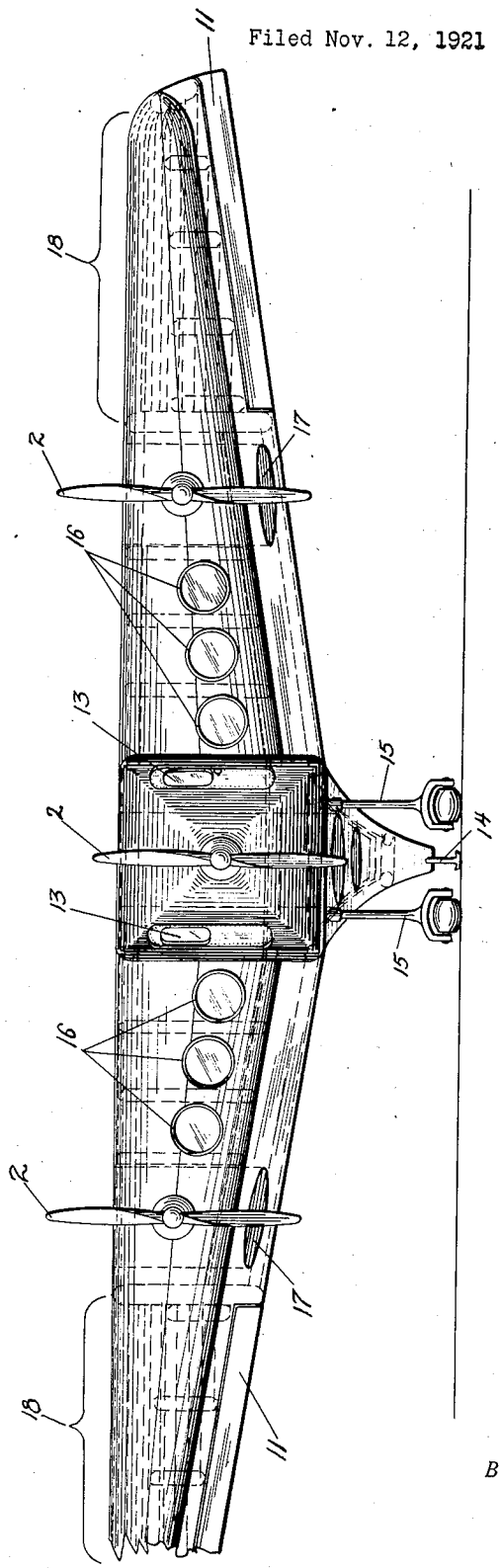
Figure 3, is a front elevation exterior view of the aircraft taken at 90 degrees angle to that shown in Figure 2, showing detail arrangements and the outline thereof.
Figure 4:
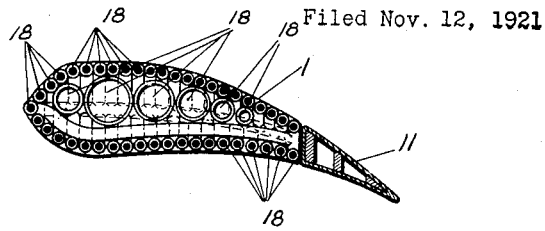
Figure 4, is a cross sectional view taken on line 4—4 as shown in Figure 1, showing details of the arrangement of the lighter-than-air compartments embodying the invention.
Figure 5:
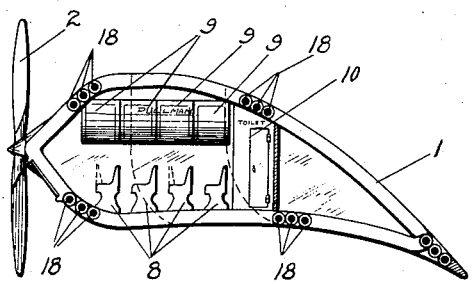
Figure 5, is a cross sectional view taken on line 5—5 as shown in Figure 1, showing various interior arrangements and details embodied in my invention.
Figure 6:
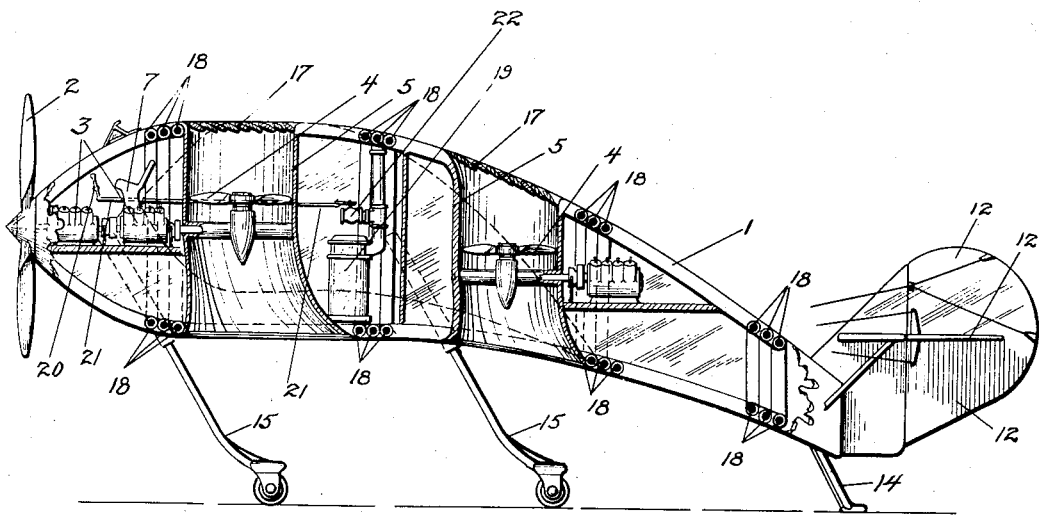
Figure 6, is a cross sectional view taken on line 6—6 as shown in Figure 1, showing other arrangements and details relative to the carrying capacity within the body of the aircraft.

In carrying out my invention, in its preferred form, an aliform body 1 is provided as shown in Figures 1, 2, 3, 4, 5 and 6, having planes built integrally therewith and thereon, as shown in various figures. Propellers 2 shown in Figures 1, 2, 3, 5 and 6 are arranged in operative relation with engines 3, which are also operatively arranged with lifting propellers 4, all shown in cross section in Figure 6. In plan view in Figure 1 the said lifting propellers 4 are encased within tubes 5 and co-axiled therein, as shown in Figures 1 and 6. Suitable pilot seats 7, as shown in Figures 1 and 6, and passenger seats 8, as shown in schematic view in Figure 1 and in cross section in Figure 5, are provided. There are various other convenient and necessary features involved in passenger carrying as shown by sleeping compartments 9 in Figure 5 and lavatory 10 as shown in Figure 5. Usual control features such as ailerons 11, as shown in Figure 1 in plan view, in Figure 3 in front view, in Figure 2 in side view, and in Figure 4 in cross sectional view, are provided. Also rudders and elevators 12 are provided, as also shown in different views 1, 2 and 6 in manually operative arrangement. Suitable entrance doors 13, as shown in Figures 1, 2 and 3 are provided. Tail skid 14 and landing supports 15, as shown in Figures 2, 3 and 6 and of any suitable design, are provided. Windows 16 are arranged aeriformly within the body and so as to form a part of the stream-lined contour thereof, as shown in Figures 1 and 6. Shutters 17 are provided to open and close the upper and lower ends of tubes 5, as shown in Figures 1, 2, 3 and 6.

Now attention is called to the fact that passenger accommodations, seats and sleeping berths are provided on either side of the center of the aircraft, as shown on line 6—6 in Figure 1. It is understood, of course, that the carrying space here shown may be used for baggage and mail purposes as well as for passenger carrying. All exposed surfaces of the aircraft are of stream-line form and are given such aerofoil curvatures both above and below that when the aircraft is moving through the air at moderate velocity, a suction on the upper surface is created tending to pull the aircraft in an upwardly direction, while on the lower surface the reaction produced by the downward deflection of air will have a tendency to lift the aircraft.

Now inside the body of the said aircraft there are provided air-tight compartments 18, shown in schematic view in Figure 1 and in various angular views in Figures 2 and 3 and cross sectional views in Figures 4, 5 and 6. Said air-tight compartments filled with a lighter-than-air element are herein shown as of tubular shape, extending generally throughout and within the framework of the aircraft, as shown, all connected in suitable series and operatively arranged with, and connected to, pump 19, as shown in cross section in Figure 6 taken on line 6—6, shown in Figure 1.

This system of air-tight compartments is held in operative position at the hands of the pilot through lever 20 shown in Figure 6 which is connected by rod 21 with control valve 22 of suitable construction shown in Figure 6, whereby the pressure within the said compartments may be increased or decreased as may be desired, either manually or automatically, according to the variations of the atmospheric pressure at different altitudes, thus providing a means by which equistatic pressure may be maintained within the said compartments so as to correspond with that of the surrounding atmosphere at all times and in all altitudes.

In operation, as it is desired to raise the aircraft into the air, engines 3 are started, then the air is expelled from and throughout the entire compartment system 18 by the operation of pump 19 and the system used, either as a vacuum or filled with a lighter-than-air gas such as hydrogen, helium, coronium, argon, or other suitable element or elements or combination of elements, naturally or artificially produced, the buoyancy thereby created within the said compartment system reduces the relative weight of the aircraft, as a whole, when compared with the surrounding air, and the said aircraft may be lifted, or tend to be lifted, from the ground by the buoyancy of the said air-tight, lighter-than-air compartment. Then by suitable controls, propeller 2 may be rotated thus providing a forward propulsion. Also lifting propellers 4 co-axiled and encased within tubes 5, may be rotated and a downward rush of air produced through the said tubes and through the shutters 17, all of which is conjoined with the buoyancy of the lighter-than-air compartment system and also aided by the lifting effects produced by forward motion as a result of the operation of the propeller 2 as the air passes over and around the entire body of the aircraft, will enable the aircraft to take the air at reduced ground speed. Inversely, landing may be made at a correspondingly reduced ground speed.

It is, of course, understood that various changes in the size, shape and relative proportions of, as well as in the various arrangements of the air-tight, lighter-than-air compartments above described may be made without departing from the spirit of this invention. It is of course understood that the lighter-than-air compartments may be used either as a vacuum or, in consequence of the same being filled with any suitable lighter-than-air gas, element or combination of elements, either naturally or artificially produced, to offset or equalize the atmospheric pressures at all altitudes, as lifting compartments. Moreover it will be understood that by the use of a lighter-than-air element, or combination of elements as above described, within compartments of increased dimensions that the lifting effect produced thereby will vary directly with the cube of the increased dimensions while the quantity of material required in its construction will be varied by the square, and that thereby the proportion of lifting effect will be increased very advantageously in larger dimensions, as hereinbefore pointed out.

It is understood that the air-tight and lighter-than-air compartments may be made either tubular, spherical or of regular or irregular polyhedrons as may be determined in any particular case, and used either with or without a means of ejection of the air therefrom, or with or without a vacuum maintained therein, or with or without any molecular, atomic or electronic constituency involved in any combination of elements. Furthermore my invention is readily adaptable to the multi-plane as well as to the mono-plane type of aircraft, such as herein illustrated.

Attention is also called to the fact that although the exposed surface of the aircraft is aliform and hence gives a lifting effect the same as any heavier-than-air type of aeroplane of the most favored and advanced construction, it is equally as adaptable to my favored, improved and advanced, type as shown in the application of August 29, 1921, Serial No. 496,530 hereinabove referred to, and likewise particularly adaptable to aircraft involving the vertical lifting propellers co-axiled within tubes constructed in the body as here shown, since the suction produced as a result of the "thick wing" construction herein illustrated and used in conjunction with the said vertical lifting propellers encased within the said tubes, because of the downward current of air is induced from a point of least atmospheric pressure above and ejected at the point of highest atmospheric pressure below and at a point of highest compression found upon the lower cambered surface of the aircraft, will give added advantage to this type of construction and to the combination, arrangement and collocation, as herein described and illustrated. No particular form of propellers are to be used and any of the most favored and improved type may be adapted either for horizontal propulsion or for lifting uses.

It is also noticed that by virtue of the combination herein specified, suggested and described, the dangers of aerial navigation will decrease directly with the square of the velocity involved in the ground speeds and, also that the momentum will vary in direct ratio with the square of that velocity, and hence smaller landing fields will be needed. Also since the intensities of both friction and vibration are likewise varied, less material will be used in construction since the strength required to overcome intense friction and vibration are inversely proportional thereto. Furthermore, while this type of construction affords a dual lifting benefit, it will be manifest that the carrying capacities will be varied according to an inverse ratio of that velocity.

Having thus pointed out and defined my invention in its preferred form and with its manifold advantages resulting from the combination, collocation and arrangement, I claim and desire to be protected by Letters Patent as follows:

1. In an aircraft, the combination of an aerofoil body, compartments arranged within the said body, a vacuum maintained within the said compartments, aerofoil wings laterally extending from the said body, compartments arranged within the said wings, a vacuum maintained within the said compartment, tubes constructed within the said aircraft having their longitudinal axis vertically disposed and transversely arranged with respect to the normal line of flight, propellers operatively arranged within the said tubes to rotate on a horizontal plane with respect to the normal line of flight, driving propellers operatively engaged with an engine, and suitable controls for the guidance of the aircraft while in flight.

2. In an aircraft, the combination of a body having aerofoil surfaces, aerofoil wings laterally extending from the said body, air-tight compartments arranged within the said body, air-tight compartments arranged within the said wings, a vacuum maintained within the said compartments and used as a means of obtaining buoyancy in the said aircraft, tubes arranged within the said body, having their longitudinal axis transverse to the normal line of flight and vertically disposed with respect thereto, tubes arranged within the said wings having their longitudinal axis transverse to the normal line of flight and vertically disposed with respect thereto, propellers journaled upon an axis coinciding with the longitudinal axis of the said tubes, the said propellers engaged to operate by means of the engine power and so journaled as to rotate transversely to the longitudinal axis of the said tubes.

3. In an aircraft the combination of a body and sustaining wing elements extending from each side thereof, a plurality of air tight compartments in said body and wings, said compartments having a lighter-than-air constituent therein, means for varying the weight of the constituent in the compartments, propelling means for advancing said aircraft, helicopter propellers between the compartments in said body and means to drive all of said propellers.

In testimony whereof I have signed my name to this specification.

CHARLES S. HALL.